United States Patent [19]
Westford

[11] 3,889,981
[45] June 17, 1975

[54] TRAILER HITCH CONNECTION PROTECTOR

[76] Inventor: Grimes Westford, 1935 10th Ave., Apt. 303, Oakland, Calif. 94606

[22] Filed: Aug. 28, 1974

[21] Appl. No.: 501,289

[52] U.S. Cl. ............ 280/507; 280/400; 280/475; 280/150 A; 293/69 R
[51] Int. Cl. .................. B60d 1/12; B60r 19/00
[58] Field of Search............ 280/507, 150 A, 150 R, 280/475, 400; 293/69 R

[56] References Cited
UNITED STATES PATENTS

| | | | |
|---|---|---|---|
| 2,608,416 | 8/1952 | Frost | 280/475 X |
| 2,608,430 | 8/1952 | Robert | 293/69 R X |
| 2,834,608 | 5/1958 | Wixson | 293/17 X |
| 2,926,930 | 3/1960 | Pease | 280/475 |
| 3,043,618 | 7/1962 | Petirrojo | 280/150 A X |
| 3,271,050 | 9/1966 | Saunders | 280/507 |

*Primary Examiner*—Leo Friaglia
*Attorney, Agent, or Firm*—Joseph B. Gardner; Theodore J. Bielen, Jr.; Richard Esty Peterson

[57] ABSTRACT

An appartus to protect a vehicle's trailer hitch point of connection from contact with the riding surface utilizing a support arm preferably secured to the trailer hitch and a spring-cushioned wheel rotatably mounted such that a portion of the wheel extends below the lowest point of the vehicle's tractor trailer hitch connection.

5 Claims, 3 Drawing Figures

TRAILER HITCH CONNECTION PROTECTOR

BACKGROUND OF THE INVENTION

The present invention relates to a novel apparatus for the protection of tractor trailer hitch connections and the like while an automobile tows a trailer.

Trailers connected to automobiles often make contact with the riding surface as a result of depressions, such as pot holes, drainage trenches, and the like. Also, trailering on unpaved roads frequently presents the situation where protuberances, such as rocks and logs, make contact with the tractor-trailer hitch connection, which typically is the lowest point in the trailer-automobile or tractor-trailer combination. Also, the vehicle itself often becomes damaged or damages the riding surface, especially on inclined surfaces such as drive ways.

An unprotected trailer hitch connection sustains damage and frequently detaches the trialer from the trailer hitch, resulting in damage to the cargo being towed on the trailer.

SUMMARY OF THE INVENTION

In accordance with the present invention, a trailer hitch connection protector is provided having a support arm connected to the trailer hitch or trailer such that the arm lies substantially horizontal to the riding surface. A wheel, such as a caster, is rotatably mounted substantially perpendicular to the arm. A portion of the wheel extends below the lowest point of the tractor-trailer hitch connection. Such orientation prevents touching of the riding surface by the trailer, the underside of the towing vehicle, and the trailer hitch connection. Thus, damage to either is prevented. The present invention also precludes the probability of accidental disconnection of the trailer from the trailer hitch, which could have serious consequences if such an event happens while the vehicle is moving.

The support arm transmits the force imparted by touching the riding surface to the vehicle itself. The wheel mounting incorporates a cushioning spring structure which obviates sudden jolts to vehicle's mode of travel.

It is, therefore, an object of the present invention to provide an apparatus to protect a vehicle trailer, the underside of the vehicle, and trailer hitch connection while a vehicle is towing a trailer.

It is a further object of the invention to prevent a vehicle trailer hitch and a trailer from sustaining damage by contact with the riding surface of the vehicle and damaging the surface itself.

It is another object of the invention to obviate the possibility of accidental release of trailer from a corresponding trailer hitch.

It is yet another object of the invention to allow safe towing of trailers on roadways.

The invention possesses other objects and advantages, especially as concerns the features and characteristics thereof which will become apparent as the specification continues.

DESCRIPTION OF THE PREFERRED EMBODIMENT

Figure 1:
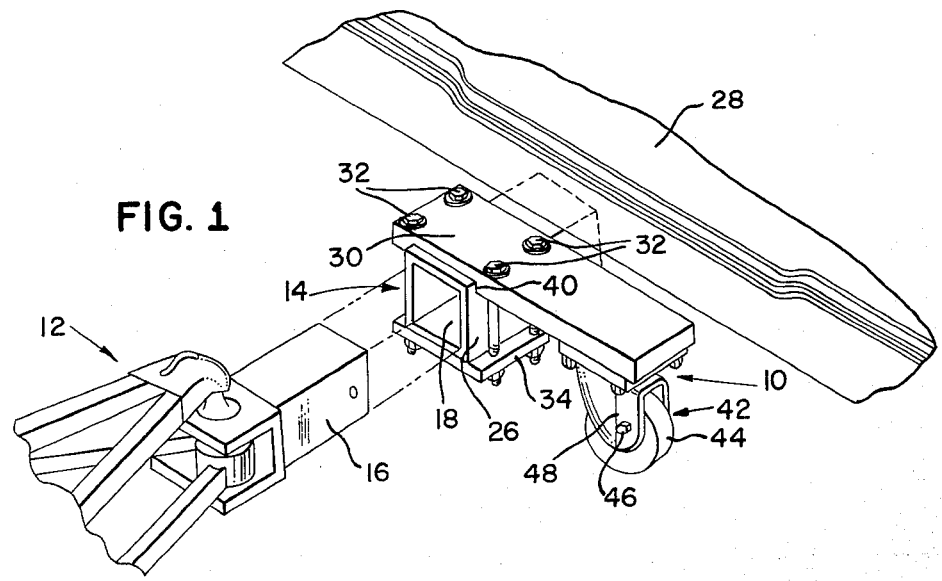
FIG. 1 is a perspective view of the invention with a portion of the trailer removed from the trailer hitch.

With reference to FIG. 1, the apparatus in its entirety is depicted by the numeral 10. A trailer 12, shown in portion, generally connects to the trailer hitch 14. The trailer 12 includes, as one of its elements, a male member 16 which fits within hitch opening 18 of a hitch support member 26 on the towing vehicle 28 in this embodiment. As is well known in the art, other types of trailer connection systems may be employed. As such, the present invention readily adapts to other types of connections with little or no structural alteration of said other connection systems.

Threaded pin 20, inserted through openings 22 and 23 in the members 26 and 16 respectively and engaged by nut 24, holds the connection of said trailer and trailer hitch by barring axial movement of the male member 16 within the hitch opening 18. Trailer hitch support member 26 structurally interconnects with the frame of the vehicle 28, shown in portion.

The apparatus 10 includes a support member 30, preferably secured to trailer hitch support member 26 as to not obstruct the path of travel of male member 16 or any electrical connections thereabout. A plurality of fasteners, such as threaded bolts 32, affix support member 30 to hitch support member 26. Plate 34, preferably fixedly attached to trailer hitch support member 26, provides openings, threaded or otherwise, through which bolts 32 pass. Nuts 38 lock threaded bolts 32 in place. Channel 40 formed in the support member 30 guides the placement of said support member 30 in mating relationship with trailer hitch support member 26.

The apparatus 10 may be attached to the male member 16 of the vehicle trailer, if desired, with slight modifications, such as the size of channel 40 and placement of plate 34 beneath the male member 16.

Figure 2:
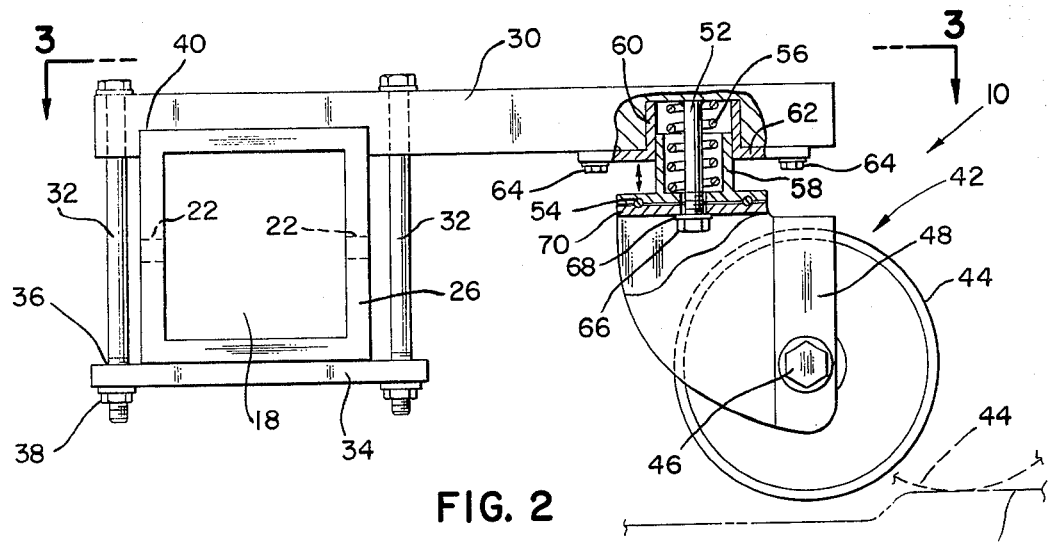
FIG. 2 is a side view of the invention mounted on a trailer hitch.
Figure 3:
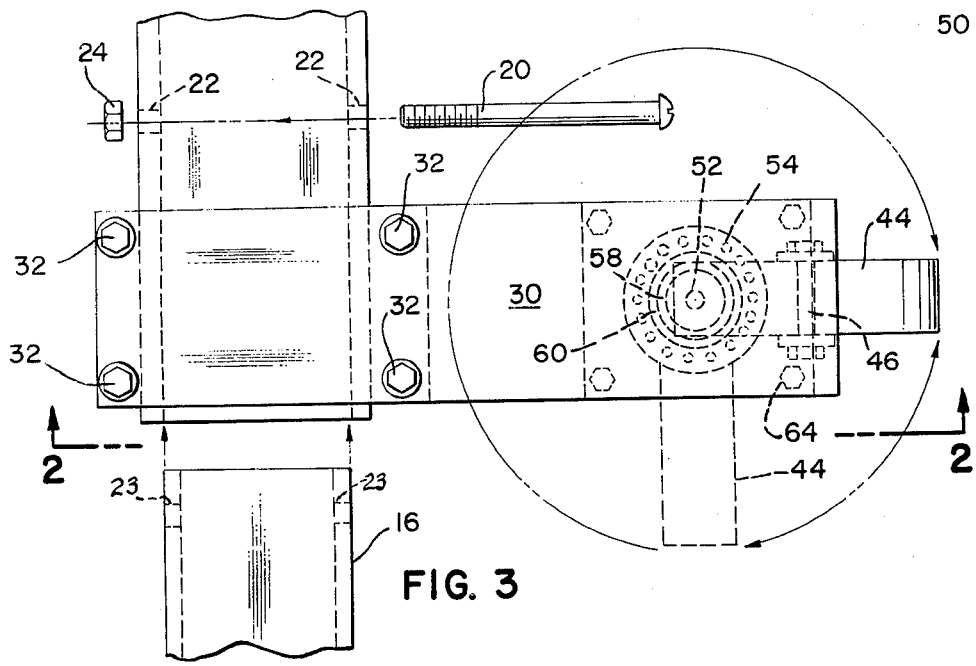
FIG. 3 is a plan view of the invention along line 3—3 of FIG. 2.

Support member 30 serves to mount wheel means 42 such that the wheel means does not interfere with the accomplishment of the trailer-trailer hitch connection by insertion of male member 16 within hitch opening 18. Wheel 44 turns on axle 46. Fork 48, at the end of shaft 52, straddles wheel 44. Wheel mounting means 42 preferably includes a ball bearing structure 54 which allows wheel 44 to rotate 360° on the axis of shaft 52, as shown in FIG. 3. The wheel rollingly engages the riding surface 50 in any direction.

To further alleviate the shock associated with wheel means 42 hitting the surface 50, a cushioning spring 56 is provided within cylindrical tubes 58 and 60. Cylindrical enclosure 60 includes a flange 62 which is bolted to wheel support member 30 with bolts 64. Shaft 52 fixed to member 30 has a threaded end which engages nut 66. Washer 68 engages plate 70, thus holding the wheel means in place.

Whenever wheel 44 encounters a portion of surface 50, cylindrical tube 58 will ride within tube 60 in an upward direction. Spring 56, which bears on lower surface of tube 58 and the upper surface of tube 60, absorbs the force of wheel 44 engaging surface 50, as is well known in the art.

In operation, the trailer-trailer hitch protector 10 affixes to either the tongue end portion of the trailer 12 or the trailer hitch 14. As the vehicle rides on the surface 50, the protector 10 will engage the surface before the trailer and trailer hitch at the connection of both. The impact force of the surface is transmitted from wheel 44 through axle 46 to fork 48 and shaft 52. The force of impact is taken up by the support member 30 by the compression action of spring 56 or the frictional engagement of cylindrical tube 58 on tube 60.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. Vehicle trailer and trailer hitch protector preventing trailer and trailer hitch near the point of connection from touching the vehicle riding surface comprising:
  a. a support member secured in the vicinity of the tractor-trailer hitch connection such that said support member does not interfere with the accomplishment of the connection and disconnection of the trailer and trailer hitch; and
  b. wheel mounting means rotatably mounted on said support member for a rotation about a vertical axis and including a wheel rotatably mounted about a horizontal axis such that at least a portion of said wheel always extends below the lowest point of the vehicle trailer-trailer hitch connection.

2. The device of claim 1 in which said wheel means includes an axle disposed through the center of said wheel, a horizontal shaft engaging said axle, and said support member includes a vertical shaft for rotatably mounting said wheel mounting means, a cushioning spring bearing on said support member and engaging a portion of said shaft to absorb the shock of said wheel contacting the riding surface of the vehicle.

3. The device of claim 2 in which said support member comprises a substantially horizontally disposed arm and said wheel mounting means is mounted substantially perpendicular to said arm.

4. The device of claim 3 in which said arm is secured to a portion of the trailer tongue.

5. The device of claim 3 in which said arm is secured to a portion of the trailer hitch support on the towing vehicle.

* * * * *